May 19, 1942.   E. J. HOUDRY ET AL   2,283,208
CATALYTIC CONVERTER
Filed March 14, 1939   2 Sheets-Sheet 2
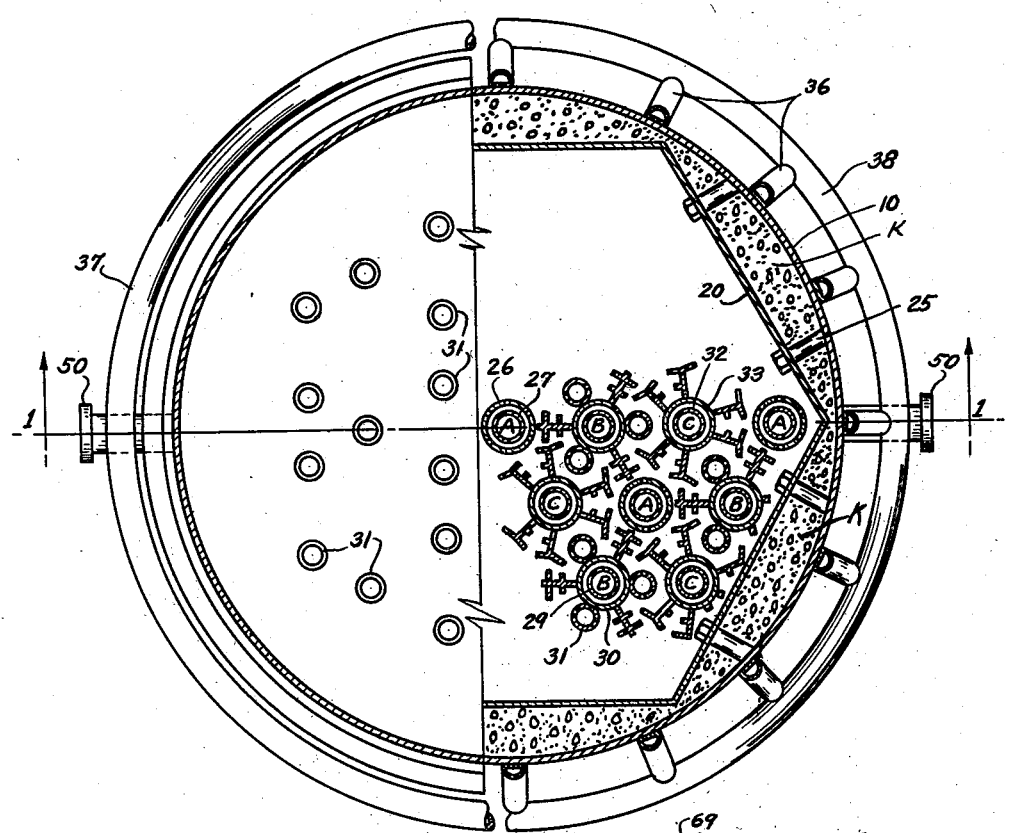
Fig-2
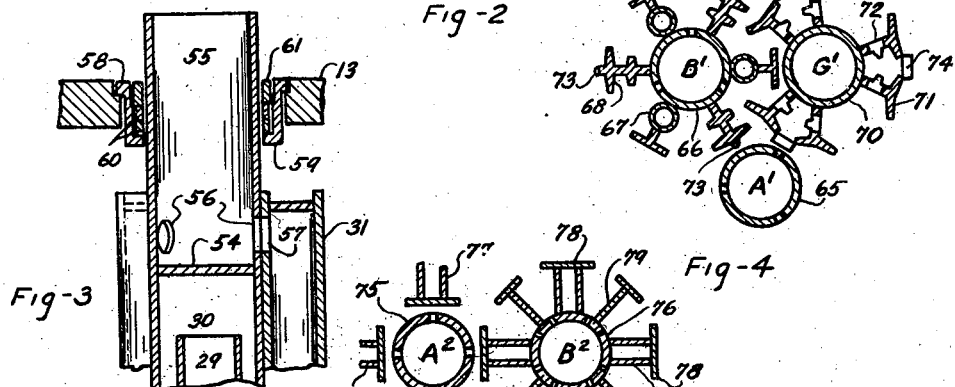
Fig-3   Fig-4
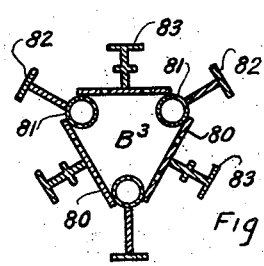
Fig-6   Fig-5
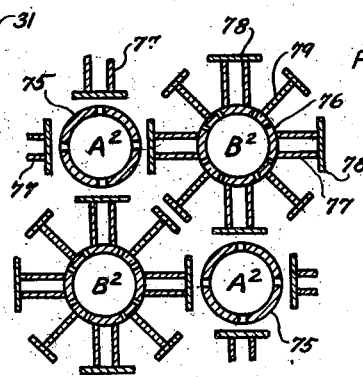
INVENTORS
EUGENE J. HOUDRY
THOMAS B. PRICKETT
BY
Ira L. Nickerson
ATTORNEY Patented May 19, 1942

2,283,208

UNITED STATES PATENT OFFICE 2,283,208

CATALYTIC CONVERTER

Eugene J. Houdry, Ardmore, and Thomas B. Prickett, Philadelphia, Pa., assignors to Houdry Process Corporation, Wilmington, Del., a corporation of Delaware Application March 14, 1939, Serial No. 261,728

10 Claims. (Cl. 23—288)

This invention relates to chemical reactions involving the use of contact material and is particularly concerned with methods and apparatus for effecting such reactions and especially for regulating the temperature of the contact material or mass.

One object of the invention is to control uniformly the temperature of all portions of the contact material. Another object is to provide for a rapid rate of heat supply or removal under controlled conditions. Another object is to maintain the contact material within a predetermined temperature range by the removal or addition of heat. Another object is to utilize reactant fluid and heat exchange fluid conduits together in direct cooperating relationship and to maintain the conduits in a uniform symmetrical pattern. Still another object is to form radial extensions on a fluid conduit which will function simultaneously with the conduit to carry other fluid and also to transfer heat through the contact material. Another object is to provide for equal distribution of fluid through the heat exchange units. Another object is to provide for efficient distribution of reaction fluid through the contact material. More specific objects of the invention will become apparent from the following detailed description.

The invention contemplates arranging the different types of conduits used for reactions effected in the presence of contact material, such as reaction fluid and heat exchange fluid conduits, in improved and novel ways so that they mutually assist each other in controlling the course of a reaction. The different conduits are formed into a composite assemblage or unit by joining their walls in heat conducting relationship, preferably by having a joint therebetween presenting extensive surface to provide for greater heat transfer. The composite assemblage is made up of a perforate reaction fluid section and an imperforate heat exchange fluid section, and either once through type of conduits or nested reverse flow type of conduits may be used for either section. In a practical embodiment of the invention, one type of conduit is disposed centrally and has one or more of the other type of conduits joined to its outer wall and radiating therefrom forming heat conducting channels for the central conduit. The conduit assemblage is useful for either exothermic or endothermic reactions and the perforated conduits may function as either inlet or outlet conduits for the reaction fluid, while the imperforate conduits may supply or withdraw heat from the contact material depending on the nature of the reaction. Separate perforate reaction fluid conduits may be supplied to assist the reaction fluid conduits of the assemblage during a reaction and separate imperforate conduits may be provided to supplement the heat exchange conduits of the composite assemblage. Various patterns may be formed in the reaction chamber by arranging the composite assemblages symmetrically therein, or with separate reaction fluid conduits and/or the separate heat exchange fluid conduits so as to provide a uniform passage of reaction fluid and uniform heat transfer.

In order to illustrate the invention and the manner of its operation, reference may be had to the accompanying drawings wherein concrete embodiments exemplifying the invention are shown, with similar parts indicated by like or similar reference characters, in which:

Fig. 2 is a transverse sectional view on two levels as indicated by line 2—2 of Fig. 1, with the contact mass and some of the conduits removed from the reaction chamber;

Fig. 3 is a detail of a modification of the composite conduit assembly shown in Fig. 1;

Figs. 4 and 5 are transverse sectional views on an enlarged scale of modified arrangements of tubes; and Fig. 6 is a transverse sectional view of a modified assemblage of conduits.

Figure 1:
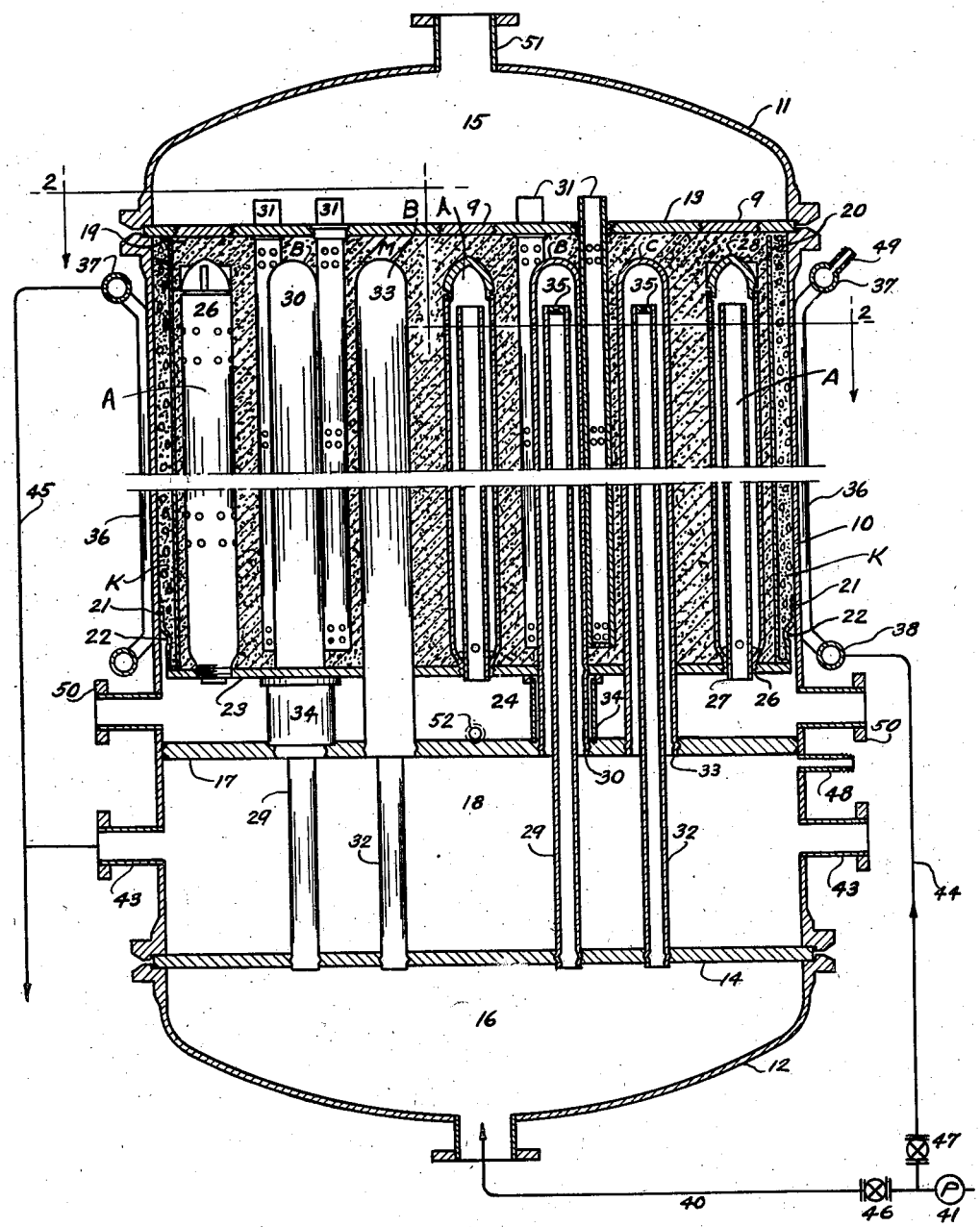
Fig. 1 is a vertical sectional view of a chemical converter showing certain parts in elevation, the section being taken substantially on line 1—1 of Fig. 2. In this figure the heat exchange fins of the various conduits are not shown in order to better emphasize the relationship of the different conduits, and a portion of the heating or cooling circuit is shown diagrammatically.

The converter disclosed in Fig. 1 comprises a cylindrical casing shown generally at 10, which may be provided with an outer covering (not shown) of suitable heat insulating material, having upper and lower closure members 11 and 12, respectively, which are provided with flanges for cooperating with upper and lower flanges on the casing in forming the converter, while top and bottom transverse tube sheets 13 and 14, respectively, are removably held between the cooperating upper and lower pairs of flanges forming with the upper and lower closure members outer fluid manifolds 15 and 16. A tube sheet 17 is disposed above and in spaced relation with the lower tube sheet 14 and rigidly secured, as by welding, to the interior wall of the converter casing, forming with the lower tube sheet an inner manifold 18. A reaction chamber 19, which is adapted to be filled with solid contact material M in the form of bits, fragments, or molded pieces and utilized to promote, enter into or in any way assist the desired reaction, is formed by positioning an inner shell 20 within the casing 10 and spaced therefrom, as shown in Fig. 1, by bending the lower end portion 21 of the shell outwardly upon itself and securing the same to the interior wall of the casing. The lower end 21, as indicated, is provided with a bend 22 to allow for movement of the shell due to contraction and expansion caused by temperature changes within the casing. The bottom of the reaction chamber is formed by means of a relatively light weight transverse wall 23, secured at the lower end of the shell 20 in suspended relation with the casing 10 forming with the transverse tube sheet 17 another inner fluid manifolding chamber 24. As shown in Fig. 2, the shell 20 is hexagonal since this shape is suitable for the particular tube arrangement. However, any other desired form of converter may be used. The shell is maintained in fixed spaced relation with the casing 10 by means of studs 25 and the space between the casing and shell is filled with insulating medium K in order to reduce the effect of outside temperature conditions on the contact material.

In Figs. 1 and 2 the converter is shown as provided with series of reaction fluid and heat exchange fluid conduits which are arranged within the reaction chamber symmetrically so that a uniform distribution of reactants and uniform transfer of heat through the contact material is provided. One series of units A which is used only for distributing or collecting reaction fluid comprises perforated outer conduits 26 having threads on their open lower ends for removably securing the conduits to the bottom wall 23 of the reaction chamber and providing communication with the inner manifold 24, and inner conduits 27, which are loosely held by the outer conduits. The inner conduit is open at both ends and may be provided with one or more openings in the lower portion to establish communication with the outer conduit at the bottom as well as the top of the inner conduit, while the outer conduit has one end closed by means of a removable cap 28 which gives ready access to the interior of the conduit for removal or insertion of the inner conduit. The conduits 26 and 27 may be removed from the reaction chamber through plugged openings 9 in the tube sheet 13.

Another series of fluid conducting units comprises assemblages B of composite conduits made up of inner and outer nested imperforate conduits 29 and 30 with a plurality of apertured conduits 31 secured in heat conducting relation longitudinally of the exterior surface of the outer heat exchange conduit 30 providing an arrangement for passing heat exchange fluid and reaction fluid simultaneously in heat conducting relation. The inner conduit 29 is open at both ends and has one end rigidly secured to the lower tube sheet 14, affording communication with the exterior manifold 16 and extends into the reaction chamber for a substantial distance. The outer conduit is open at one end only which is secured to the tube sheet 17 in communication with the inner manifold 18 and extends into the reaction chamber with its closed end spaced from the inner open end of the inner conduit providing therewith an arrangement for passing heat exchange fluid in reverse flow. The reaction fluid conduits 31 are secured to the outer heat exchange conduits 30 with their lower ends preferably closed and in slightly spaced relation with the bottom wall of the reaction chamber 23 and the upper ends of each extending through the upper tube sheet 13 in sliding engagement therewith and in fluid communication with the exterior manifold 15. The composite assemblages B of conduits are positioned uniformly about the nested reaction fluid units A and, as clearly indicated in Fig. 2, are equally spaced from the units A and positioned 120° apart, forming a three-unit pattern of composite conduits around the reaction fluid conduits. Other units C, which are used only for the passage of heat exchange fluid, are disposed within the reaction chamber and comprise inner open end conduits 32, secured to the lower transverse tube sheet 14, and closed end outer conduits 33, secured to the tube sheet 17 in a manner similar to the nested heat exchange conduits of the assemblages B. These heat exchange units, as shown in Fig. 2, are equally spaced from the reaction fluid units A and, similarly to the composite assemblages B, are positioned 120° apart, forming with the assemblages B a six-conduit pattern disposed about the reaction fluid units A. Suitable bracing rings 34 (Fig. 1) may be positioned around some of the outer heat exchange conduits 30 or 33 within the manifold 24 to supply rigidity to the bottom wall 23 of the reaction chamber. The inner conduits 29 and 32 are provided with orifice plates 35 in order to increase the resistance to flow of the fluid, or pressure drop, through the conduits and the orifices are preferably positioned in the upper end of the conduits to provide jets for reducing or eliminating air pockets or dead spaces in the closed ends of the outer tubes. These conduits, as clearly indicated in Fig. 2, are provided with heat conducting fins which radiate outwardly therefrom and act as channels for transferring heat between portions of the contact material and the conduits. The fins may take any desired form but, as shown in the figure, are provided with lateral extensions for more effective and uniform transfer of heat through the mass. Provision is made for maintaining the exterior wall of the casing at substantially the temperature of the contact material in order to provide a uniform temperature throughout the body of contact material and to this end a plurality of heat exchange fluid tubes 36 are secured directly to the outer wall of the casing, and in order to provide increased surface contact between the tubes and casing and consequently greater conduction of heat, the tubes as indicated in Fig. 2 have their surfaces flattened. The tubes 36 are secured at their upper and lower ends to headers 37 and 38, respectively, in order to continuously pass fluid through the tubes. Any type of heat exchange medium may be used for controlling the temperature of the contact material and the exterior wall of the casing, such as a single phase fluid which does not or is not permitted to vaporize, including fused salts or certain metals and metal alloys, or a two phase fluid, such as water, mercury or diphenyl, may be used when large amounts of heat are to be removed or supplied. The heat exchange fluid will be supplied to the lower manifold 16 through a line 40 by means of a pump 41 and pass upwardly through the inner heat exchange conduits 29 and 32 and out through the orifices 35, which compensate for any inequalities in the length of the conduits 29 or 32 by increasing the pressure drop through the conduits in order to prevent short circuiting of the fluid through the shorter conduits and thereby insure distribution of heat exchange fluid through all of the conduits. The fluid then passes through the outer conduits 30 and 33 into the outlet heat exchange manifold 18 where it may be withdrawn through one or more outlet connections 43. In order simultaneously to pass the heat exchange fluid through the conduits 36 a take-off line 44 is connected to the line 40 and to the lower heat exchange header 38 and another line 45 connects the outlet header 37 with an outlet connection 43. Throttle valves 46 and 47 are provided in the fluid lines 40 and 44, respectively, in order to control the amount of fluid passing to the manifold 16 and header 38. When the heat exchange medium such as fused salts is in liquid form and has a vapor pressure which is sufficiently low to prevent any appreciable vaporization under vacuum at the temperature at which the medium is used, vacuum air relief vents 48 and 49 may be provided on the outlet manifold 18 and outlet header 37.

Reactants may be supplied to the reaction chamber through either of connections 50 on manifold where they are passed through the inner conduits 27 to the outer conduits 26 and outwardly thereof through the perforations to the contact material and the products of reaction picked up by the perforated conduits 31 and carried to the upper manifold 15 where they are withdrawn through connection 51, or the reactants may be supplied in a reverse manner to the upper manifold 15 through connection 51 passing therefrom through the perforations in conduits 31 into the contact material and the products of reaction picked up by the reaction fluid conduits 26, carried to the manifold 24 through the inner conduits 27 and withdrawn by the connections 50. When the converter is used for an endothermic reaction such as the transformation, conversion or other treatment of high boiling hydrocarbons into lower boiling hydrocarbons, the starting material may be supplied to the contact mass above the temperature of reaction through either series of reaction fluid conduits, whereupon it is not necessary to supply additional heat to the contact material through the heat exchange units to maintain the reaction. When, however, it is desirable to admit the reactants to the converter at or below the reaction temperature and to supply the heat of reaction thereto before or after they have reached the reaction chamber, the perforated conduits of the assembly will function only as distributors for the starting material which will receive the necessary heat supply from the heat exchange conduits. During this endothermic on-steam period of the reaction, however, a contaminating carbonaceous deposit is formed on the contact material necessitating the regeneration of the material which may be accomplished by oxidizing or burning of the deposit by supplying air or some other oxygen containing medium to the material. Since the reaction taking place during the regenerating step is exothermic, it is essential to maintain the temperature of the reaction within a predetermined range by the removal of excess heat from the contact material and this is readily accomplished by supplying the air or other regenerating medium to the material through the reaction fluid conduits 26 and 27 and withdrawing the products of reaction through the conduits 31 of the composite conduit assembly B so that the excess heat of the reaction is directly conducted by the conduits 31 from the contact material to the heat exchange medium in the conduits 29 and 30.

With the above description of operation in mind, it is emphasized that the composite conduit assembly permits a wide flexibility of use in the cyclic operation of a converter in alternate endothermic and/or exothermic reactions. For example, the perforated sections of the assembled conduits may be used for collecting the products resulting from each reaction of the cycle while the reactant fluid may be supplied by separate perforated conduits or the perforated sections of the assembled conduits may be used to supply the reactants for each of the reactions and the resulting products collected by a separate set of conduits. Also they may be used during one of the reactions of the cycle for supplying the reactant fluid and be used during the other reaction of the cycle for collecting the products of the reaction.

The contact material M may be of any known or desired type. For certain reactions on hydrocarbons it will preferably be silicious in character and of natural or artificial origin, such as blends or compounds of silica and alumina with or without the addition of small amounts of other active components such as metals or metallic compounds. The contact material in fragments or molded form may be supplied to the reaction chamber 19 through the plugged openings 9 in the tube sheet 13 and it may be removed from the chamber by unscrewing and raising the conduits 26 upwardly a sufficient distance to permit the material to fall into the manifold 24 from which it can be removed by pneumatic or other means through the connections 50. To avoid the possibility that any of the charge or products of reaction be left as liquid in manifold 24, suitable drains 52 are provided along the tube sheet 17 for withdrawing such liquid before admitting the regenerating medium to the manifold in order to prevent combustion of the material and consequent injury to the converter parts.

In Fig. 3 a modification of the composite conduit assemblage described in connection with Fig. 1 is shown which provides a single conduit end 55 extending through tube sheet 13 and serving as a manifold for the perforated conduits 31 of assemblages B. To this end the reaction fluid conduits 31 are secured in heat conducting relation with the outer heat exchange conduit 30 in a manner similar to that described in connection with Fig. 1, but each of the reaction fluid conduits is closed at its upper end and terminates within the reaction chamber below the upper tube sheet 13. The outer heat exchange conduit 30 is provided with a transverse partition 54 to direct the heat exchange fluid from the inner conduit 29 in reverse flow and forms the extension 55 which communicates with the manifold 15. Apertures 56 are provided in the extension 55 for manifolding the conduits 31 therewith through aligned apertures 57 formed in the conduits. The extension 55 is secured in the tube sheet 13 by means of a slip joint which comprises a housing 58 secured in an aperture in upper tube sheet 13 in spaced relation with the extension 55 and the housing at its bottom is provided with an inwardly extending flange 59 for seating piston rings 60 within the housing which are held in place by a sealing ring 61, welded or otherwise secured to the housing 58.

Fig. 4 shows a modified form of the invention and is similar to Fig. 2 in the respect that it comprises a pattern of three different types of conduit units, namely, the unit AI which is used only for passing fluid reactants; BI, which is a composite assemblage of conduits and is used for simultaneous passage of fluid reactants and heat exchange fluid, and CI, which is used only for passage of heat exchange fluid. In this form of the invention all of the conduits provide a once-through flow of reactants or heat exchange fluid. The unit AI comprises an apertured conduit 65 for distributing reactant fluid or collecting products of reaction, while the unit BI is made up of a centrally disposed perforated conduit 66, which may be used for distributing reactant fluid or collecting reaction products, and has equally spaced imperforate conduits 67 secured to the exterior wall of the conduits 66 for passing heat exchange fluid. The conduits 66 are provided with radially extending fins 68, forming channels for transferring heat between the contact material and the conduit, and conduits 67 have fins 69 which cooperate with these conduits in providing extended heat transfer channels. The unit CI comprises an imperforate conduit 70, which is adapted only to pass heat exchange fluid and has radially extending fins 71, forming heat transferring channels and, as shown, these fins are provided with apertures 72 at points along their length to assist in the distribution of reaction fluid through the contact material. The units AI are surrounded by units BI, which are equally spaced therefrom and positioned 120° apart while units CI are similarly positioned between the units BI, forming a pattern similar to that disclosed in Fig. 2. In order to provide for efficient and uniform passage of reaction fluid through the contact material the perforations are grouped in conduits 65 and 66 in a manner similar to the perforations in conduits 26 and 31 of Fig. 1—that is, the groups of perforations are placed in one set of conduits so as to be positioned in the reaction chamber alternately with the groups of perforations in the conduits of the other set to provide a longer path of flow between these sets of conduits. The fins 71 on the conduits 70 are positioned with respect to the perforated conduits 65 or 66 so that the perforations 72 of these fins are substantially in line with the perforations of the conduits of the set used for collecting the products of reaction. The conduits of the other set, which are used for distributing reactants, will be positioned so that their perforations direct the fluid between adjacent fins 71 for passage through the perforations 72, in order to prevent short circuiting of the fluid around the fins. Means are provided for maintaining the different conduits in spaced relation and, as indicated, may take the form of extensions 73 and 74 secured at points adjacent the top of the fins 68 and 71, respectively, forming spacing means around the units AI, or the spacing means may as well be secured to the exterior wall of the conduits 65.

In Fig. 5 another modification of the invention is shown and comprises a square pattern using only two different types of fluid units. The pattern is made up of units A2, having a perforated conduit 75, which may be used for distributing reactant fluid or collecting reaction products and a composite assemblage B2 made up of a centrally disposed perforate conduit 76 which may likewise be used for distributing reactants or collecting reaction products, and radially extending heat exchange fluid conduits 77, which are provided with transversely extending fins 78. The conduits 76 may also be provided with radially extending fins 79, disposed between the conduits 77 in order to provide for more uniform transfer of heat through contact material. In using these two types of fluid units the square pattern is formed by positioning the different conduits alternately on points of intersection of a square.

Fig. 6 shows another modified type of composite assembly in which one or more conduits of one type are joined to the interior wall of another type of conduit which may be either a reaction fluid or a heat exchange fluid conduit. One efficient way of constructing this assembly, as shown in the figure, is to weld or otherwise secure perforated plates 80 to the outer walls of a plurality of imperforate heat exchange fluid conduits 81 in order to form therewith a perforated reaction fluid conduit B3. Fins 82 are provided on the conduits 81 and one or more fins 83 may be provided on the plates 80 to provide extended heat transfer channels. Alternatively plates 80 may be imperforate to utilize conduit B3 for the passage of a heat exchange medium, conduits 81 then having their outwardly exposed parts perforated to serve as inlet or outlet conduits for reactants and reaction products.

In all the forms of the invention above described heat is transferred through the contact material largely by conduction and convection. However, it is within the scope of the invention to, in addition, provide for the transference of heat by radiation. When this is desired the temperature may be regulated in accordance with the disclosure of Patent No. 2,078,947 issued to E. J. Houdry et al., May 4, 1937, which shows single or nested conduits within the contact mass for passing heat exchange fluid in straight through or reverse flow manner and which are surrounded by other perforate or imperforate conduits in order to space or insulate the fluid conduits from the contact material.

While the invention has been disclosed in several preferred forms, they are to be understood as only exemplary of the invention, which is limited only by the scope of the appended claims.

We claim as our invention:

1. In apparatus for effecting chemical reactions, a converter having a reaction chamber, a contact mass in said chamber, perforated conduits embedded in said mass in symmetrical arrangement, composite conduit assemblages positioned in the mass at spaced intervals, said assemblages comprising perforate and imperforate conduits secured together along their side walls adapted to pass reaction fluid and heat exchange fluid in heat conducting relation with the contact mass, said perforated portions of the assemblage being so constructed and arranged to cooperate with the first mentioned perforated conduits in transferring reaction fluid through the mass.

2. A converter having a pair of opposed walls providing a reaction chamber for containing contact material, in combination with a composite conduit assemblage, said assemblage comprising a central imperforate conduit having an open end secured to and communicating through one opposed wall and a closed end in the reaction chamber positioned adjacent the other opposed wall, a plurality of perforate conduits joined along their outer walls to the imperforate conduit, a conduit extension on said imperforate conduit secured to and communicating through said other opposed wall, said extension having perforations therein communicating with the perforated conduits, said central imperforate conduit having an open end inner conduit positioned in nested telescoping relation therewith and communicating through said one opposed wall for passing a heat exchange fluid in indirect heat exchange relation with the contact material and fluid conducting means adapted to cooperate with said perforate conduits in passing reactants through the contact material.

3. A converter having a pair of opposed walls providing a reaction chamber for containing contact material, in combination with a composite conduit assemblage, said assemblage comprising a central imperforate conduit having an open end secured to and communicating through one opposed wall and a closed end in the reaction chamber positioned adjacent the other opposed wall, a plurality of perforate conduits joined along their outer walls to the imperforate conduit, and having open ends extending through said other opposed wall, said central imperforate conduit having an open end inner conduit positioned in nested telescoping relation therewith and communicating through said one opposed wall for passing a heat exchange fluid in indirect heat exchange relation with the contact material and fluid conducting means adapted to cooperate with said perforate conduits in passing reactants through the contact material.

4. In apparatus for effecting chemical reactions, a converter having top and bottom walls providing a reaction chamber adapted to contain a body of contact material, heat exchange units of nested conduits disposed in the reaction chamber, said units each comprising an open end inner conduit and a closed end outer conduit, each inner conduit having an open end within the outer conduit and adjacent its closed end, said closed end of the outer conduit being positioned adjacent the reaction chamber top wall and its open end communicating through the bottom wall, and an orifice plate in the inner conduits adjacent the upper open end in order to equalize the distribution of fluid through the units.

5. The combination with a contact mass for effecting chemical reactions of a composite conduit assemblage embedded in said mass, said assemblage comprising perforate and imperforate conduits joined along their outer walls in heat conducting relationship for passing reaction fluid through the contact mass from a perforate conduit and heat exchange fluid in indirect heat exchange relation with the mass through an imperforate conduit.

6. The combination with contact material for effecting chemical reactions of a conduit assemblage made up of a centrally disposed heat exchange fluid conducting unit of inner and outer nested reverse flow imperforate conduits and a plurality of equally spaced perforate reactant fluid conduits having their walls fixedly secured to the outer of the nested conduits along their side walls in heat conducting relation, said reactant fluid conduits forming heat-conducting channels for transferring heat between the contact material and heat exchange unit.

7. The combination with a body of contact material of a composite conduit assemblage, said assemblage comprising a central imperforate conduit and a plurality of perforate conduits, said perforate conduits having their outer walls joined along the outer walls of the imperforate conduit in a manner to provide substantial heat conduction between the perforate and imperforate conduits, said perforate conduits being spaced, fins extending from said imperforate conduit and between the perforate conduits to assist said last mentioned conduits in transferring heat between the imperforate conduit and the contact material, said fins being apertured for the passage of fluid from the perforate conduits.

8. A fluid conducting unit for use in controlling chemical reactions carried out with the aid of contact material comprising perforate and imperforate conduit sections, adapted for the passage of heat exchange fluid in indirect heat exchange relation with the contact material and reaction fluid directly through the contact material, said conduit sections being joined together along their side walls in heat conducting relation in order to transfer heat between said contact material and said heat exchange fluid.

9. A fluid conducting unit for use in controlling chemical reactions carried out with the aid of contact material comprising perforate and imperforate conduits utilized for the passage of reaction fluid through the contact material by the perforate conduits and for the passage of heat exchange fluid in indirect heat exchange relation with the contact material by the imperforate conduits, said conduits being positioned within the contact mass with their longitudinal axes in parallelism and their side walls in physical contact to provide substantial heat conduction along the side walls in order to transfer heat between said contact material and said heat exchange fluid.

10. A fluid conducting unit adapted to be used in a reaction chamber having side and end walls comprising a perforated outer conduit having one open end removably held in an end wall of the chamber and a free open end extending into the chamber and positioned adjacent the other chamber end wall, a cap removably secured to said free open end, an inner conduit having one open end removably held in registration with the open end of the outer conduit and in communication with fluid supply means, said inner conduit having another open end positioned adjacent the removable cap of the outer conduit, said last-mentioned end wall having an aperture permitting access to the chamber for removal of said fluid conducting unit.

EUGENE J. HOUDRY.
THOMAS B. PRICKETT.